(12) United States Patent
Ryden

(10) Patent No.: US 6,822,235 B2
(45) Date of Patent: Nov. 23, 2004

(54) ENVIRONMENTAL RADIOACTIVITY MONITOR

(75) Inventor: David John Ryden, Sutton Courtenay (GB)

(73) Assignee: Canberra Harwell Ltd., Didcot (GB)

( * ) Notice: Subject to any disclaimer, the term of this patent is extended or adjusted under 35 U.S.C. 154(b) by 140 days.

(21) Appl. No.: 10/194,231

(22) Filed: Jul. 15, 2002

(65) Prior Publication Data
US 2003/0015655 A1 Jan. 23, 2003

(51) Int. Cl.[7] .................................................. G01T 7/04
(52) U.S. Cl. .............................. 250/336.1; 250/370.02
(58) Field of Search ...................... 250/336.1, 370.01, 250/370.02, 370.03

(56) References Cited

U.S. PATENT DOCUMENTS 4,888,485 A    12/1989  Becker ................. 250/370.06
5,124,936 A     6/1992  Pelletier ............... 364/527
5,235,190 A  *  8/1993  Tucker et al. .......... 250/435

* cited by examiner

Primary Examiner—Constantine Hannaher
Assistant Examiner—Timothy Moran
(74) Attorney, Agent, or Firm—William H. Holt

(57) ABSTRACT

An environmental radioactivity monitor comprises a filter (12) through which air is caused to flow, and a detector (13) of radiation emitted from the particles trapped on the filter. The signals from the radiation detector are analyzed into a multiplicity of energy channels, for example with a multi-channel analyzer (22), the counts in at least two energy windows (W1, W2; W3, W4) being used to determine the shapes of the low-energy tails of the peaks of the naturally occurring radio-nuclides ThC' and RaC', so their effects can be eliminated. The shape of the ThC' peak is used to predict and strip out the ThC peak, and the shape of the RaC' peak is then used to predict and strip out the RaA peak, so all background effects are eliminated. Accurate measurements of air-borne radioactivity are hence possible with short counting times.

14 Claims, 3 Drawing Sheets

ENVIRONMENTAL RADIOACTIVITY MONITOR

The present invention relates to an environmental radioactivity monitor, and in particular to an air monitor for monitoring for the presence of radioactive materials in the air, and a method of analyzing signals in such a monitor.

Such air monitors are currently known, consisting of a pump to pump a stream of air through a filter, and means to detect radiation emitted by particles trapped on the filter. A problem with all such devices is the need to discriminate against radiation from natural background sources, in particular α particles emitted by radon and thoron daughters. The principal background sources of α radiation are as follows:

Po-218 (RaA) at 6.0 MeV
Po-214 (RaC') at 7.68 MeV
Bi-212 (ThC) at 6.05 MeV
Po-212 (ThC') at 8.78 MeV.

The two thoron daughters, ThC and ThC', are always in equilibrium with each other. It will be appreciated that the radiation from RaA and from ThC overlap with each other in the energy spectrum.

The principal radioactive nuclides of interest are typically isotopes of uranium, plutonium or americium that emit α rays of energy up to 5.5 MeV. For example:

U-234 (4.75 MeV)
U-235 (4.15 to 4.6 MeV)
U-238 (4.2 MeV)
Pu-238 (5.5 MeV)
Pu-239 (5.15 MeV)
Pu-240 (5.2 MeV)
Am-241 (5.5 MeV)

In each of these cases the α radiation is of lower energy than those emitted by the background nuclides. The α radiation from any such radioisotope is emitted with a well-defined energy, but the energy received and detected by the detector depends upon the path travelled by the α particle; consequently the peaks in the energy spectrum due to α radiation are asymmetrical, with a gradual approximately exponential decline on the low energy side of each peak that may be referred to as a low-energy tail.

Usually the background due to radon and thoron daughters' α activity collected by a filter is considerably greater than the α activity of interest. For example it is often the case that the α background is several hundred times that corresponding to an alarm level of plutonium. One way such discrimination can be performed is to measure the count rate in a part of the spectrum in which only background radiation is expected, for example in an energy window between say 5.6 MeV and 6.3 MeV α energy, and then to assume that the background radiation in another part of the spectrum (where radiation from nuclides of interest would be detected) can be simply related to that in the first part of the spectrum. This approach may be improved to provide somewhat better discrimination by dividing the spectrum into say four windows that include different portions of signal α activity of interest, and the three background components, for example: 3 MeV to 5.6 MeV (signal plus all background nuclides); 5.6 MeV to 6.3 MeV (all background nuclides); 6.3 MeV to 8.0 MeV (RaC', ThC+ThC'); and 8.0 MeV to 10 MeV (ThC' only). Such an approach can be reasonably effective, but may become inaccurate as a result of changes in the shape and position of the peaks in the spectrum; these changes may for example arise from changes in aerosol size, dust loading on the filter, filter fibre characteristics, air density, and amplifier gain drifts. An aim of the present invention is to overcome such problems by taking changes of spectrum shape into account.

According to the present invention there is provided an environmental radioactivity monitor including a radiation detector to detect radiation emitted from a sample that may comprise radioactive material from the environment, wherein the monitor incorporates means to analyse the signals from the radiation detector into a multiplicity of energy channels, means to use the counts in at least two energy windows to determine the shape of the low-energy tail of the ThC' peak, means to use the shape of the ThC' peak to predict the ThC peak, and means to correct the energy spectrum by stripping out the low-energy tail of the ThC' peak and stripping out the ThC peak; means to use the counts in at least two energy windows to determine the shape of the low-energy tail of the RaC' peak, and means to correct the energy spectrum by stripping out the low-energy tail of the RaC' peak.

The monitor having these features is suitable for detecting radioactive material in the sample, in the presence of sources of background radiation, as long as there is no significant peak from RaA. This would not generally be true for monitors making real-time observations, but would be true for samples separated from the environment for a few minutes, because RaA itself has a half life of about 3 minutes and is generated by radon (Rn-222) which is a gas. In situations where there may be a peak from RaA, such as an air monitor making real-time measurements, the monitor of the invention also incorporates means to use the shape of the RaC' peak to predict the RaA peak, and means to correct the energy spectrum by stripping out the RaA peak.

Preferably the signals are analyzed using a multi-channel analyzer, this typically having 256 channels. These channels may be arranged to cover the energy range 0 to 10 MeV. The low end of this range is likely to primarily result from β radiation, and the signals of energy above say 2.5 MeV can be assumed to result from α particles. In determining the shapes of the low-energy tails, the energy windows would usually combine the counts from a number of adjacent channels. This can increase the counts being analyzed to determine the shape, so decreasing the response time. It will be appreciated that the fundamental requirements for an environmental radiation monitor are to provide accurate and reliable measurements within a short response time. The present invention enables each separate component of the background α radiation to be stripped individually, so that accurate results can be obtained even if spectral shapes and peak locations are changing, and even if the relative activities of the α-emitting background nuclides are changing.

The monitor may also include means to locate the peak and upper edge of each component of the α background spectrum, so that if necessary any changes in these locations can be taken into account. The monitor preferably also comprises means to identify signals corresponding to β particles.

In a preferred embodiment the sample is a filter through which air has been caused to flow. For example the environmental radiation monitor may be an air monitor, that is to say it may comprise a filter, and means to cause air to flow through the filter, the radiation detector being arranged to detect radiation emitted from the filter.

The invention will now be further and more particularly described, by way of example only, and with reference to the accompanying drawings, in which.

Figure 1:
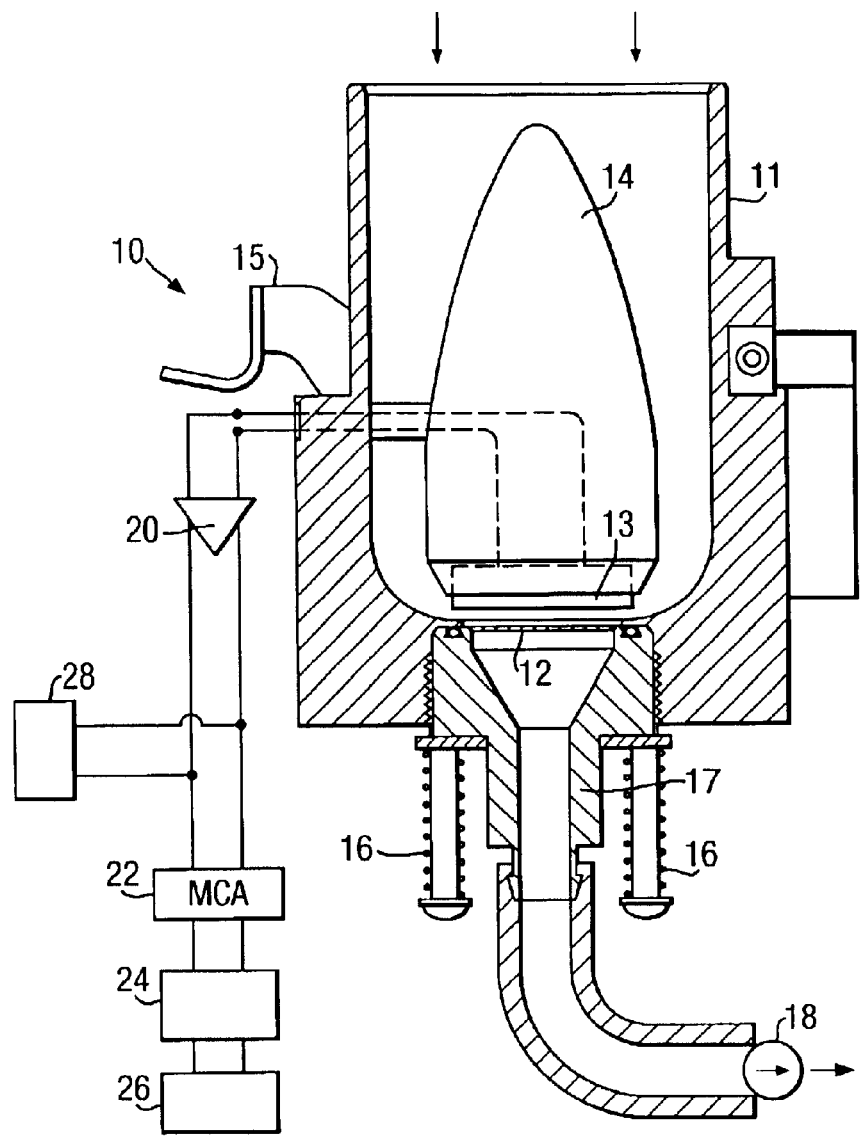
FIG. 1 shows a longitudinal sectional view of a detector and a simplified block diagram of the associated electronic circuitry.

Referring to FIG. 1 an air monitor 10 includes an open-ended duct 11 in which is supported a filter paper 12. A passivated ion-implanted silicon diode radiation detector 13 is mounted at one end of a generally conical flow diverter 14 supported centrally within the duct 11 so that the detector 13 is 5 mm from the front surface of the filter paper 12. The filter paper 12 is supported by a base part 17 defining a duct that communicates with a pump 18; a hinged handle 15 enables the base part 17 to be depressed against resilient springs 16 when the filter paper 12 is to be replaced. In operation, the pump 18 continuously draws a stream of air through the filter paper 12. Any radioactive particulate material, and radioactive particulate material combined with dust, is trapped by the filter paper 12. Radiation emitted by such trapped material is detected by the diode detector 13, which produces a pulse in response to detection of each α or β particle. For α particles the pulse height is proportional to the received energy. For β particles the pulses are of smaller amplitude, and there is no consistent proportionality between the pulse height and the energy of an individual β particle.

Electrical pulses from the diode detector 13 are passed through an amplifier 20 to a multi-channel analyzer 22 in which they are classified according to pulse height into 256 channels, the 256 channels covering the energy range 0 to 10 MeV of absorbed energy. At regular intervals, signals from the multi-channel analyzer 22 indicating the number of counts in each channel are passed to a microcomputer 24 for analysis. This involves calculating and subtracting the contribution of the background α activity to the count in each channel, so as to leave the net contribution of the long-lived activity of interest. If as a consequence of that analysis unexpected levels of a radio nuclide are detected, a signal is provided to an alarm 26. The net α activity may for example be measured over a rolling 5-minute averaging time that is updated at 15 second intervals; in addition the microcomputer 24 also calculates the collected activity over a short averaging time (typically 15 seconds) so as to provide a rapid response and alarm if the amount of radioactivity collected by the filter paper 12 were to reach high levels.

Figure 2:
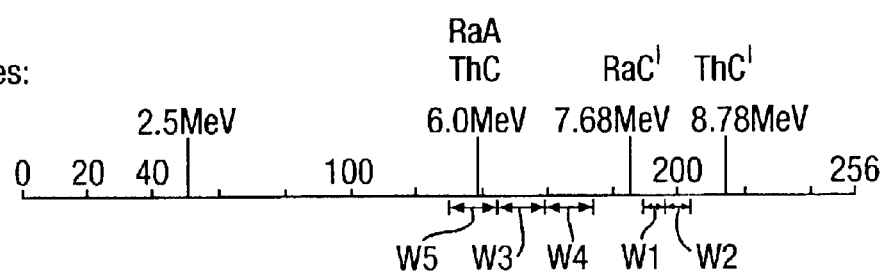
FIG. 2 shows diagrammatically the relationship between energy spectrum peaks from background radio-nuclides and channel numbers.

Referring to FIG. 2, this shows the channel numbers, the corresponding α emission energies, and (where appropriate) the radio-nuclides that emit α particles with those energies. It will be appreciated that in every case the detected energy (i.e. the energy received by the diode 13) must be less than the emitted energy by at least 0.5 MeV, because the α particles lose about 0.5 MeV in crossing the air gap between the filter 12 and the diode 13, and with some types of diode 13 there may also be a significant energy loss at the entrance window of the diode. It is normally assumed that the channel number is related linearly to the received energy, and the energy loss between emission and detection is a constant for α particles; β particles in contrast lose much less energy crossing the air gap. (Over the entire energy range (for α particles) a power law may provide a more accurate relationship between channel number and detected energy.) The channel numbers are given by way of example only, as they clearly depend on the gain of the amplifier 20. The lower limit of the α spectrum (channel 50 in this example) is chosen so that the most energetic β emitters that might be collected on the filter paper 12 produce a negligible count rate above that channel. Signals below channel 50, i.e. below a detected energy of say about 2.0 MeV, are presumed to be due to β particles; these signals may be processed separately, either using signals from the lower channels of the multi-channel analyzer 22, or using a dedicated signal discriminator 28 (see FIG. 1).

One analysis route will now be outlined.

Firstly the ThC' spectrum is extrapolated to the channels below 190. This is performed by finding an equation for the low-energy tail of the ThC' peak, using the counts in two energy windows, for example window W1, which is channels 190 to 197, and window W2, which is channels 198 to 205 (i.e. two windows that are below the ThC' peak at about channel 215, but above the RaC' peak at about channel 185). From these two counts an amplitude and an exponential decrease exponent can be calculated which characterise the shape of that tail. The counts used in this calculation may be accumulated over a time period that is the same as that used to detect the activity of interest, or alternatively may be accumulated over a longer period (for greater statistical accuracy). Hence the shape of the low-energy tail below channel 190 is predicted, that is to say the expected number of counts in each channel corresponding to ThC' decay is calculated.

This assumes that the low-energy tail can be represented by a simple exponential, which is in practice a good approximation to its true shape. Although a somewhat more exact characterisation could be obtained by using the sum of two exponentials, in practice the improvement is marginal. More than two energy windows may instead be used in characterising the low-energy tail, and alternatively a least squares fit can be made using counts in all the channels 190 to 205.

The ThC' spectrum is to be used in predicting the shape of the ThC spectrum. However, because ThC' has a half-life which is short compared with the resolving time of spectrometry-standard amplifiers, some 25% of ThC' α particles will be detected effectively in coincidence with ThC β particles. These may be referred to as pseudo-coincident β particles. The effect of pseudo-coincident β particles is most clearly evident in the ThC' spectrum above the channel (about 215) corresponding to the 8.78 MeV emitted α energy, as ideally there should be no α particles above that energy so the number of counts per channel should fall rapidly to zero within a few channels of the spectrum peak; the pseudo-coincident β particles cause a significant extension of the spectrum into channels well above the peak. The observed ThC' spectrum is the sum of two spectra: the ThC' α spectrum resulting from ThC' α decay without a coincident β particle, and the result of convolving this ThC' α spectrum with the ThC β spectrum.

The ThC' peak can be corrected for example by removing those counts that fall more than say three channels above the peak, and distributing them into the other channels of the ThC' spectrum in proportion to the number of counts in each of those channels. This has a negligible effect on the shape of the low-energy tail of the ThC' peak. An alternative, more exact but more complex way, is to deconvolute the spectrum using the known shape of the spectrum from ThC β particles, which rises from zero to a maximum over approximately 3 channels and then falls with an approximately exponential decay with increasing channel number. The deconvolution entails subtracting from each channel those counts that, because of a coincident ThC β emission, have been shifted into that channel from lower channels, and also to add to each channel those counts that have been shifted to higher channels because of a coincident ThC β emission.

The corrected ThC' spectrum is then used to predict the spectrum shape for ThC. This first entails shifting the spectrum from a peak at 8.78 MeV (about channel 215) to a peak at 6.0 MeV (about channel 139). Next the shifted spectrum is adjusted to take into account the difference in the specific energy loss at the lower energy, the stopping power for 6.05 MeV as for example being about 1.3 times the stopping power for 8.78 MeV αs (this ratio of stopping powers being F); this may be done by an arithmetic manipulation equivalent to stretching the x-axis (the energy axis) by a factor F from the peak channel downwards, so the counts are spread over a wider range of energy i.e. a wider range of channels. Somewhat greater precision might be achieved by using a stretching factor F that increases with falling α energy (e.g. from 1.30 to 1.35).

Alternatively this adjustment might be performed by raising the count in each channel to the power 1/F, and then normalising to ensure the total number of counts in the ThC' spectrum is unaltered.

The spectrum is lastly adjusted to take into account the relative activities of ThC and ThC'. The decay of ThC in 36% of occasions occurs by direct emission of 6.05 MeV α ray, and 64% by emission of a β ray followed by 8.78 MeV α, so this adjustment involves multiplying each shifted and adjusted channel count by a factor of 36/64=0.5625.

The corrected counts in all the channels can now be stripped of the contributions of ThC' and of ThC. The remaining background is that due to RaC' and RaA. These are dealt with in a similar fashion.

Firstly the RaC' spectrum is extrapolated to the channels below 145, by finding an equation for its low-energy tail, using the counts in two energy windows, for example window W3, which is channels 145 to 159, and window W4, which is channels 160 to 174 (i.e. two windows that are below the RaC' peak at about channel 185, but above the expected RaA peak at about channel 139). From these two counts an amplitude and an exponential decrease exponent can be calculated which characterise the shape of that tail. The counts used in this calculation may be accumulated over a period that is the same as that used in detecting the activity on interest, or alternatively may be accumulated over a longer time period. Hence the shape of the low-energy tail below channel 145 is predicted, that is to say the expected number of counts in each channel corresponding to RaC' decay is calculated.

As with ThC', the RaC' low-energy tail might alternatively be extrapolated using more than two energy windows, or by making a least squares fit. Furthermore, as with ThC', a somewhat more exact characterisation could be obtained by using the sum of two exponentials, but the resulting improvement compared to a single exponential is only marginal.

The overall shape of the RaC' α energy spectrum is hence known from the corrected counts in the channels from 145 upwards, and in the channels below 145 from the calculated low-energy tail shape. The remaining counts in all the channels can now be stripped of the contribution from RaC'.

This shape of the RaC' spectrum is then used to predict the spectrum shape for RaA. This involves shifting the spectrum from a peak at 7.68 MeV (about channel 185) to a peak at 6.0 MeV (about channel 139). Next the shifted spectrum is adjusted to take into account the difference in the specific energy loss at the lower energy, the stopping power for 6.0 MeV αs being about 1.2 times the stopping power for 7.68 MeV αs (this ratio of stopping powers being F); this may be done by an operation equivalent to stretching the x-axis (the energy axis) by a factor F from the peak channel downwards. As discussed above, it may be preferable to use a increasing value of F as the energy decreases. (Alternatively this adjustment might be performed by raising the count in each channel to the power 1/F.) This adjusted and shifted spectrum is then normalized so that it provides the observed number of counts in the energy window W5 between energies 5.5 MeV (channel 127) and energy 6.3 MeV (channel 144). The remaining counts in all the channels can now be stripped of the contribution from RaA.

The remaining counts, primarily in the α energy range 2.5 MeV up to 5.5 MeV, can be interpreted as corresponding to α radiation from other radio-nuclides, for example U-234 at 4.78 MeV and Pu-239 at 5.15 MeV. If these signals exceed a threshold then an alarm signal may be provided.

It will be appreciated that the signals corresponding to an α energy less than 2.5 MeV (i.e. a detected energy 2.0 MeV) can be assumed to be due to β particles, and may be processed separately. Radon and thoron daughters not only produce an α background as described above, but also produce a β background against which any β activity of interest must be detected. The total counts over the detected energy range say 30 keV up to 2.0 MeV may be corrected for background radiation. The background β radiation may be calculated from the α spectra of ThC', ThC, RaC' and RaA determined as described above, with allowance made for non-equilibrium between the various radon and thoron daughters. This calculated β background can then be subtracted from the counts in the β region of the spectrum. Hence any radio-nuclides that emit β particles can also be detected by the monitor 10.

It will thus be appreciated that the present invention enables α spectra to be corrected for the expected background α emitters even though the spectral shape and position of the peaks may change. Such changes may occur during normal operations for the following reasons:
1. Variations in aerosol characteristics (size, shape or composition).
2. Variations in the fraction of the radon daughters (principally RaA) that are not attached to airborne particles.
3. Variations in filter characteristics due to variations in the production process.
4. Increased dust loading on the filter.
5. Changes in air density due to normal changes in barometric pressure or temperature.

In addition, changes to the spectral shape or peak positions may occur for the following, less usual, reasons:
6. A change in the type of filter being used.
7. A change in altitude.
8. A change in the nature of the gas being sampled.
9. Condensation, dust or dirt on the detector.
10. Drift in amplifier gain.

The αs emitted from RaC' arise from aerosol particles that have been trapped on the filter 12 in about the preceding hour (because of the short half lives of the preceding nuclides in the decay chain). However the αs emitted by ThC and ThC' may arise from particles that have been trapped over a period of many hours. Consequently the ThC and ThC' peaks may be more degraded than those from the radon daughters. The energy resolution of the α spectra from the radon daughters tends to improve with increasing dust loading, because material already on the filter increases the collection efficiency for particulate material. Hence very significant changes in the shape of the peak and the slope of the low-energy tails may occur as the dust loading increases.

It will be appreciated that an air monitor of the invention may differ from that described above while remaining within the scope of the invention. In particular the determination of the shape of the low-energy tail of the ThC' and RaC' peaks might use energy windows that were spaced apart, rather than contiguous; it might use windows narrower than those described above, or wider (indeed it may use overlapping windows); and might use more than two windows. Alternatively it may use a least square fit carried out over several windows or channels. Nevertheless it is desirable to use reasonably wide windows as this increases the count rate in each window, so reducing the time required to obtain meaningful data.

As described above the peaks were taken as occurring in predetermined channels, but alternatively the channels at which the peaks from the background sources of radiation appear may be reset whenever the instrument 10 is calibrated. Alternatively the instrument 10 may continuously determine the locations of the spectral peaks and edges, adjusting the energy windows W1–W5 accordingly. In this case the variations in peak position and spectral shape discussed above would be automatically compensated for.

The errors in measuring the airborne activity of interest arise in part from statistical errors that are due to the random nature of the radioactive decay process, and in part from systematic errors due to inaccurate compensation. Such systematic errors would be due principally to unpredictable changes in spectrum shape. The random errors are inversely proportional to the square root of the averaging time, and to the square root of the sampling rate, so these measurement errors can be reduced by increasing the averaging time or the air-sampling rate or both. The present invention reduces the principal cause of systematic errors, and so provides better scope for reducing overall errors.

Figure 3:
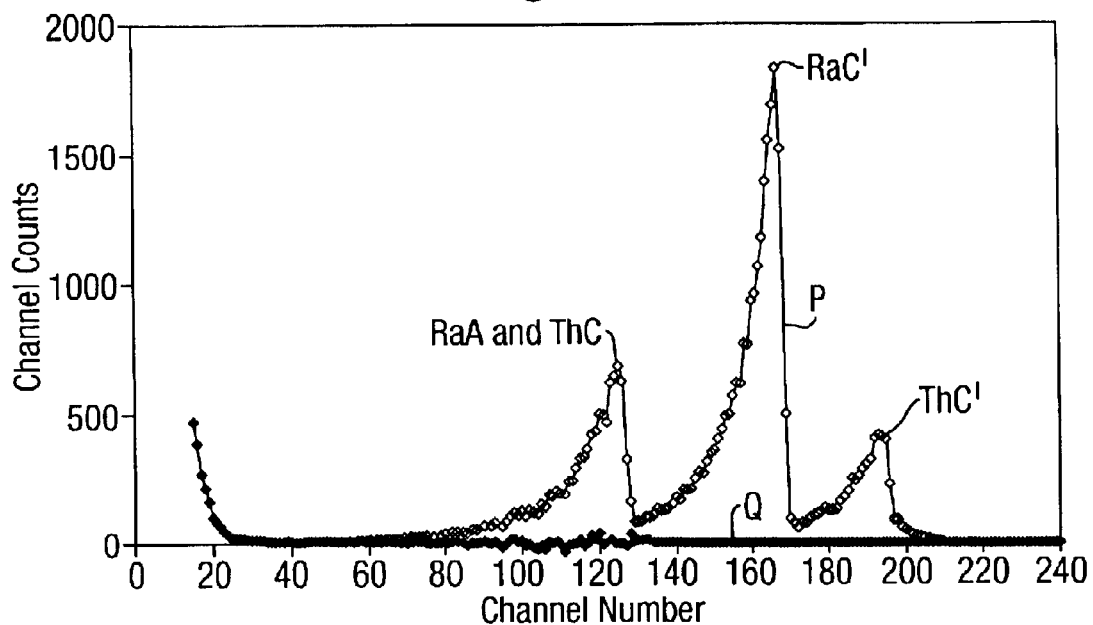
FIG. 3 shows graphically an example of an initial spectrum, and the final spectrum after removal of all background components.

The signal analysis procedure described above will now be further exemplified. Referring to FIG. 3, this shows an experimental determination of the energy spectrum P in a context in which only background radiation components are present. The graph shows the counts in each channel, plotted against the channel number; it will be noted that the channel numbers differ from those described above, because the amplifier gain was different. The graph Q shows the final spectrum after the above signal analysis has been performed.

Referring to graph P it is evident that there are three peaks, each of which is steep on the high energy side, but has a gradually decreasing low-energy tail. If any isotope of concern had been present, it would have produced signals typically between channels 80 and 120, and unless it produced a very large signal it would be difficult to detect above background signals from the low energy tails. The three peaks are labelled with the corresponding background nuclides: RaA and ThC, RaC', and ThC'.

Figure 4:
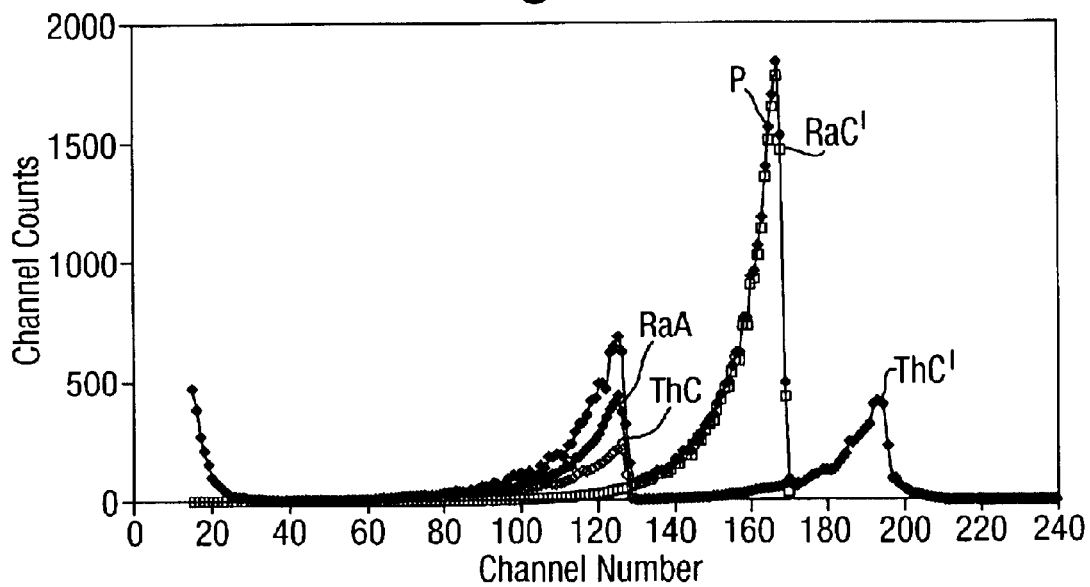
FIG. 4 shows graphically the initial spectrum (as in FIG. 3) and the component peaks.

Referring now to FIG. 4, this shows the same energy spectrum P (black diamonds) and also shows the extrapolated low-energy tail of the ThC' peak; and the corrected counts for the RaC' peak (hollow squares) and its extrapolated low-energy tail. It also shows the ThC peak (as predicted from the ThC' peak), and the RaA peak (predicted from the RaC' peak). Subtraction of these four peaks from the original spectrum P gives the final spectrum Q of FIG. 3.

Figure 5:
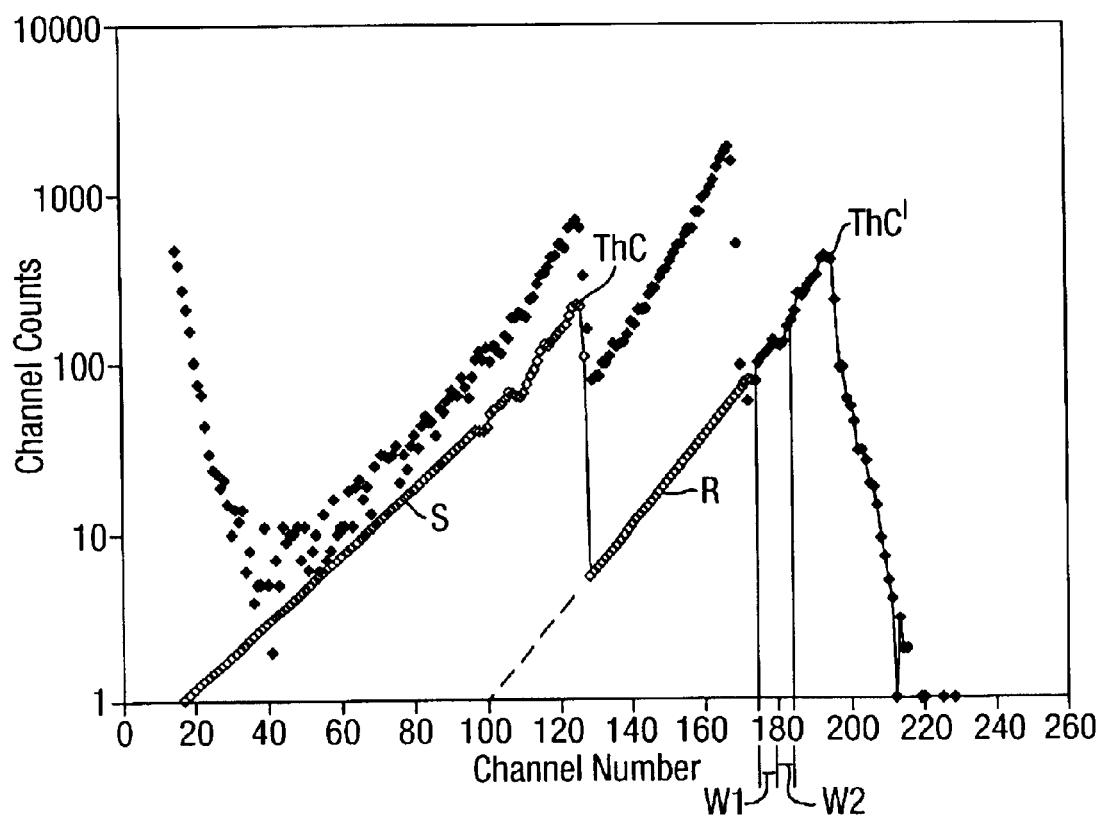
FIG. 5 illustrates graphically the steps in the removal of two of the background peaks.

Referring now to FIG. 5, this shows the same energy spectrum but with the channel counts plotted on a logarithmic scale. As explained earlier, the low-energy tail of the ThC' peak is extrapolated (line R of hollow diamonds) from the counts in the two windows W1 and W2 at the low-energy side of the peak, and the ThC', peak (after correction for pseudo-coincident β particles) is then shifted to a lower energy, and stretched, so as to predict the shape of the ThC peak. This gives the peak marked ThC with its predicted low-energy tail marked S (this graph actually shows the sum of the counts for both the ThC peak and the ThC' peak). This combined spectrum ThC and ThC' can then be subtracted from the initial spectrum P. As explained earlier, a similar procedure is then used to extrapolate the RaC' peak and to predict the RaA peak, and hence to eliminate their contribution to the background spectrum P.

It will be appreciated that the counting periods used in determining the airborne activity of interest may be different from the counting periods used to determine the shapes of the peaks due to background radiation. For example α radiation may be measured on the basis of a 5 minute counting time, updated at 15 s intervals, while the data used to predict the shapes of the low-energy tails may be based on a 20 minute counting time, updated at 15 s intervals. For the first few minutes after switching the air monitor 10 on there is insufficient count data to provide accurate predictions for the shapes of the low-energy tails, and instead the calculations may be carried out on the basis of preset default values.

The signal analysis procedure described above is equally applicable in monitoring other environmental samples. For example it may be used to monitor radioactivity on filters after their removal from an air monitor. In this case the most significant difference is that RaA will have decayed to negligible levels after say 15 minutes. Consequently no compensation is needed for RaA. Furthermore, monitoring filters in this way enables radionuclides to be detected that may emit α particles of energy up to 6.5 MeV, such as Cm-242, Cm-244 or Cf-252, which would otherwise be indistinguishable from RaA.

I claim:

1. An environmental radioactivity monitor including a radiation detector to detect radiation emitted from a sample that may comprise radioactive material from the environment, wherein the monitor incorporates means to analyse the signals from the radiation detector into a multiplicity of energy channels, means to use the counts in at least two energy windows to determine the shape of the low-energy tail of the ThC' peak, means to use the shape of the ThC' peak to predict the ThC peak, and means to correct the energy spectrum by stripping out the low-energy tail of the ThC' peak and stripping out the ThC peak; means to use the counts in at least two energy windows to determine the shape of the low-energy tail of the RaC' peak, and means to correct the energy spectrum by stripping out the low-energy tail of the RaC' peak.

2. An environmental radioactivity monitor as claimed in claim 1, wherein the monitor also comprises means to use the shape of the RaC' peak to predict the RaA peak, and means to correct the energy spectrum by stripping out the RaA peak.

3. A monitor as claimed in claim 2, wherein, to predict the ThC peak, the data representing the ThC' peak is shifted from an energy of 8.78 MeV to an energy of 6.0 MeV, the shifted spectrum is adjusted to take into account the difference in specific energy loss, and is scaled by a factor of 36/64.

4. A monitor as claimed in claim 2, wherein the data representing the ThC' peak is initially processed to eliminate distortion due to pseudo-coincident β emissions.

5. A monitor as claimed in claim 2 wherein, to predict the RaA peak, the low-energy tail of the RaC' peak is extrapolated to energies less than 6.0 MeV, the data representing the RaC' peak is shifted from an energy of 7.68 MeV to an energy of 6.0 MeV, the shifted spectrum is adjusted to take into account the difference in specific energy loss, and is normalized to provide the observed counts after stripping out the counts due to ThC and ThC' in an energy window that encompasses part of the RaA peak but extends no lower than 5.5 MeV.

6. An environmental radioactivity monitor as claimed in claim 1 wherein the signals are analyzed using a multi-channel analyzer.

7. An environmental radioactivity monitor as claimed in claim 6 wherein, in determining the shapes of the low-energy tails, the energy windows combine the counts from a number of adjacent channels of the multi-channel analyzer.

8. An environmental radioactivity monitor as claimed in claim 1 wherein the sample is a filter through which air has been caused to flow.

9. An environmental radioactivity monitor as claimed in claim 8, the monitor comprising a filter, and means to cause air to flow through the filter, and wherein the radiation detector is arranged to detect radiation emitted from the filter.

10. A monitor as claimed in claim 1, wherein, to predict the ThC peak, the data representing the ThC' peak is shifted from an energy of 8.78 MeV to an energy of 6.0 MeV, the shifted spectrum is adjusted to take into account the difference in specific energy loss, and is scaled by a factor of 36/64.

11. A monitor as claimed in claim 1, wherein the data representing the ThC' peak is initially processed to eliminate distortion due to pseudo-coincident $\beta$ emissions.

12. A monitor as claimed in claim 1 wherein the observed and predicted shapes of the alpha-peaks from ThC', ThC, RaC' and RaA are used to predict and strip out a $\beta$ background.

13. A method of analyzing signals representing radiation emitted from a sample that may comprise radioactive material from the environment, the method comprising analyzing the signals into a multiplicity of energy channels, using the counts in at least two energy windows to determine the shape of the low-energy tail of the ThC' peak, using the shape of the ThC' peak to predict the ThC peak, and then correcting the energy spectrum by stripping out the low-energy tail of the ThC' peak and the ThC peak, using the counts in at least two energy windows to determine the shape of the low-energy tail of the RaC' peak, and correcting the energy spectrum by stripping out the low-energy tail of the RaC' peak.

14. A method as claimed in claim 13, also comprising using the shape of the RaC' peak to predict the RaA peak, and correcting the energy spectrum by stripping out the RaA peak.

* * * * *